3,058,300
ISOPROPYLBICYCLOHEXYL FUEL
Milton Kosmin, Dayton, Ohio, assignor to Monsanto Chemical Company, St. Louis, Mo., a corporation of Delaware
No Drawing. Filed Apr. 14, 1958, Ser. No. 728,080
8 Claims. (Cl. 60—35.4)

The present invention relates to a method for the operation of jet engines, particularly the turbo-jet and turbo-prop type for use in various types of aircraft, rockets and space ships. The invention also relates to an improved fuel suitable for use in various types of jet and rocket engines, particularly at very high altitudes.

An object of the invention is to provide a high energy hydrocarbon fuel for rockets and jet engines, for instance in providing the increased power necessary for aircraft take-offs and emergency combat operations or as a fuel for a guided missile. It is a further object to provide a fuel which may be used and stored at low temperatures without solidifying. Another object is to operate an engine without producing a smoky exhaust.

A still further object of the invention is to provide a hydrocarbon fuel for jet engines having a boiling point within the range of about 500° F. to about 550° F., or preferably from about 510° F. to about 535° F., at atmospheric pressure.

A still further object of the invention is to provide a hydrocarbon fuel for jet engines which combines in a single product all of the foregoing properties.

A still further object of the invention is to provide an improved method of operating jet engines, particularly turbojet and turboprop aircraft engines.

Other objects and advantages will become apparent to those skilled in the art as the description of the invention proceeds.

The development of jet engines, rockets and missiles has been accompanied by the requirement for developing fuels suitable for such new engines. A difficulty which has been encountered in this field is that aircraft employing jet and rocket engines are often required to operate at very high altitudes. Conventional fuels are found to solidify at such temperatures, e.g., below 0° C. The use of various modifiers and inhibitors has not completely solved this problem.

Another difficulty which has been encountered in the use of certain prior art organic compounds utilized as jet and rocket engine fuels is the development of smoke. This is obviously undesirable since it makes it easier for the flying object to be tracked and detected by the trail of incompletely burned carbon resulting from such smoky combustion. Certain unsaturated compounds which are adequate for low altitude turbine engine fueling have been found to be subject to such smoky combustion when utilized under the extreme conditions of high altitude flight such as is contemplated in the present invention.

Mixtures of straight-chain and/or branched chain aliphatic hydrocarbons have been and are being used as fuels for aircraft engines and while they have enjoyed a considerable amount of success, they are subject to a number of disadvantages which substantially restrict their range of utility.

One serious disadvantage of these prior known fuels is that they have a heat of combustion of about 112,000 B.t.u. per gallon and no one has been able, so far as we are aware, to improve this figure, that is, to raise it above 112,000 B.t.u. per gallon and at the same time obtain the other characteristics necessary for a jet fuel. With the current trend in aircraft design, this presents a problem as to the use of such fuels in military or commercial aircraft. For example, aircraft generally, and particularly military aircraft, are being designed for higher and higher speeds. Accordingly, the wing sections are getting thinner and thinner and there is increasingly less space for storage of fuel in the wings. Consequently, these fuels are being stored in the fuselage of such aircraft. This presents a safety hazard and also a problem of maintaining the center of gravity of such aircraft and, therefore, specially designed equipment is installed to automatically and continuously alternate the use from one tank to another to maintain the center of gravity.

Another disadvantage of the known fuels is that they have high vapor pressures and tend to flash off rapidly as the aircraft gains altitude. This can be overcome by pressurizing the fuel tanks, but if this is done, it is necessary to increase their structural strength which means adding weight to the aircraft. Moreover, in the case of self-sealing tanks, pressurizing does not satisfactorily solve the problem since this causes loss of protection from the self-sealing action.

It has now been found that turbo-jet and rocket engines may be utilized to obtain an extremely high power output even when operating under very low ambient temperature by operating such engines with isopropylbicyclohexyl as the fuel. The combustion is carried out as an oxidation reaction in which the said isopropylbicyclohexyl is burned with air or oxygen, including the use of oxygen enriched air. It is particularly advantageous to employ liquid oxygen as the oxidizing agent which is supplied from a tank in the missile and which is metered at the proper proportion together with isopropylbicyclohexyl to assure complete combustion without the development of smoke or carbon particles. It is easily possible when utilizing the isopropylbicyclohexyl fuel to achieve complete combustion with the theoretical proportions of oxygen or air, or preferably with a slight excess of the oxidizing component. The said isopropylbicyclohexyl may be utilized as the sole component of the fuel, or may be formulated as a composite fuel together with other hydrocarbon components, for example, conventional jet fuels. In such composite fuels it is preferred that the isopropylbicyclohexyl be present in the proportion of from 10% to 90% by weight of the total fuel. The isopropylbicyclohexyl is advantageously employed in the operation of jet and rocket engines because of its extremely high energy content. The heat of combustion of this compound is 136,303 B.t.u. per gallon whereas conventional fuels such as aircraft gasoline have a heat of combustion of only about 112,000 B.t.u. per gallon.

Another advantage which is found to accrue in utilizing isopropylbicyclohexyl as a jet or rocket fuel in contrast to certain incompletely hydrogenated compounds of the prior art is the extremely low freezing point. Thus, isopropylbicyclohexyl has a freezing point of −66° F., in contrast to freezing points of the order of 0° F. to 20° C., for partially hydrogenated polycyclic aromatic compounds of the prior art. The isopropylbicyclohexyl is also characterized by an improved viscosity in contrast to the partially hydrogenated polycyclic groups of compounds. Isopropylbicyclohexyl has a viscosity of 89 centistokes at 0° F., whereas the incompletely hydrogenated group of polycyclic aromatic compounds are found to have viscosities of the order of from 50,000 to 100,000 centistokes at 0° F.

Isopropylbicyclohexyl when employed as a fuel for oxidation in a turbine jet or rocket engine is characterized by unusually high thermal stability. This factor is of importance not only in the actual combustion taking place in the engine but also in a number of areas prior to the burning step. For example, it is a conventional practice in the design of jet engine power plants to cool the main engine oil in a fuel oil heat exchanger, thus obtaining maximum utilization of the fuel. As a result of this practice the fuel is usually subjected to thermal stress and degradation in a number of areas. The areas are: (a) at the main or auxiliary fuel tanks, (b) in the above described fuel oil heat exchanger, and (c) in the engine fuel system. In each of these areas the development of heat may result in degradation of the fuel with the development of gum and coke deposits. An experimental method has been developed for the measurement of coking tendency of jet and rocket fuels. This is the Co-operative Fuels Research Fuel Coker Method described in Appendix No. 27 of the 1957 Standard of the American Society for Testing Materials. In this method the fuel is passed for a specified time through a system of metallic tubes subjected to a standard temperature of 450° F. The pressure drop across the tubes is measured, thus providing an indication of the development of coke within the tubes and the closing of the free space within the tubes as a result of such carbon deposition. Isopropylbicyclohexyl has been found to deposit relatively little coke in this test as is shown by a pressure drop of only 0.11 inch to mercury. This value obviously indicates superior performance over the compound decalin, which developed a pressure drop of 0.5 inch of mercury under comparable conditions while other jet fuels have pressure drop values of from 3.9 to 25 inches of mercury. Another advantage in the use of isopropylbicyclohexyl in contrast to decalin as a fuel in turbine, rocket and guided missile engines or power plants is that the isopropylbicyclohexyl has a far higher boiling range, e.g., 535–545° F. in contrast to 264–380° F. for decalin. The boiling range of a conventional hydrocarbon jet fuel, JP4 also has a very wide boiling range, beginning at low initial boiling point 130° F. to 500° F. Consequently, this fuel has a very high vapor pressure. This factor is important since the high temperatures which may be encountered in the fuel system and storage areas as set forth above may cause vapor lock of a relatively low boiling fuel. Furthermore, the low boiling fuels are more difficult to pump and require stronger tanks and fuel lines in order to accommodate the higher vapor pressure. These disadvantages are overcome by the isopropylbicyclohexyl because of its low vapor pressure commensurate with the high boiling range of this compound.

The development of fuels for jet engines, missiles, rockets and space ships began with the use of conventional hydrocarbon fuels such as aircraft grade gasoline. However, it was soon realized that the high altitudes to which the newer aircraft and missiles were to be sent required that the fuels be stable at very low temperatures without crystallization or sluggish flow as characterized by high viscosity. The amount of energy available from a given tank full of fuel also becomes extremely important because of the rapid combustion of fuel and the limitation on fuel storage in missiles, rockets, etc. The isopropylbicyclohexyl fuels described in the present application have been found to overcome the problems of the prior art and to provide a high energy fuel having good thermal stability as well as the combustion characteristics necessary for the extremely rapid combustion required in the operation of jet and missile engines. The need for thermally stable fuels with relatively low vapor pressure at elevated temperatures also requires that the fuel be a high density material. For example, the conventional gasoline and kerosene fraction fuels have densities of about 0.6 to 0.7. In contrast thereto the isopropylbicyclohexyl of the present invention has a density of about 0.88. This factor is of importance because of the volume limitation of many aircraft such as the fighter types, as well as the even more critical limitations encountered in rocket and space ship design. It is therefore imperative that the fuel for such devices have the highest energy content per unit volume.

Isopropylbicyclohexyl as utilized in the present invention is preferably made by the alkylation of biphenyl with propylene, such as by the use of aluminum chloride as the alkylation catalyst. The alkylated intermediate is then hydrogenated in order to obtain isopropylbicyclohexyl. The product thus obtained is composed almost exclusively of the 3 and 4 isomers, that is 3-isopropylbicyclohexyl and 4-isopropylbicyclohexyl which accordingly constitute a preferred embodiment of the present invention. These two isomers may be separated if desired, but are equally useful and hence desirably employed as a mixture in the present method of operating an engine. The 3 and 4 isomers obtained as described above have also been found to be more desirable as high energy fuels than 2-isopropylbicyclohexyl. The latter compound has been found to have a melting point in the range of from 10° F. to 20° F., and consequently exists as a solid glass at ordinary temperatures. In contradistinction 3-isopropylbicyclohexyl and 4-isopropylbicyclohexyl mixtures have melting points of about −66° F. This factor is of importance in the storage of the fuel, since under arctic conditions or the low temperatures of outer space, it is important that the fuel remain liquid and readily pumpable.

The following example illustrates a specific embodiment of the present invention.

A sample of conventional jet fuel (JP–4) and a sample of isopropylbicyclohexyl were subjected to inspection tests in order to show the thermal and physical properties of these two materials and their suitability in the operation of a jet engine.

| | Isopropylbicyclohexyl | JP–4 |
|---|---|---|
| B.t.u. per gallon | 136,303 | 120,000. |
| Density | 0.88536 g./cc.=7.3887 lbs./gal. | 0.776. |
| Boiling range | 513–531.5° F | 130–500° F. |
| Thermal stability (CFR Coker, preheater at 450° F., filter at 500° F.): | | |
| Deposit | Rating, satisfactory | Considerable. |
| Pressure drop | 0.11″ Hg | Varies from 4″ to 25″ Hg with average value of 11″. |

The above data indicate the desirability of utilizing isopropylbicyclohexyl as the fuel in various types of jet engines. It is also found that a high degree of thrust is developed in turbojet, turboprop, ramjet and rocket engines when isopropylbiphenyl is employed as the fuel in the operation of the engines.

The fuels of the present invention are eminently suitable for use in various types of jet and rocket engines. In employing the isopropylbicyclohexyl composition in the operation of ramjet engines the fuel is provided in a pressurized tank. As is well known provision must also be made to bring such a device up to the critical velocity in which the method of ramjet operations become practical. At such critical speed, the ramjet engines draw in sufficient air and compresses the same so that it might be admixed with the isopropylbicyclohexyl fuel in order to develop the necessary thrust to drive the aircraft.

In operating rocket type engines with the isopropylbicyclohexyl fuel, separate pressure tanks are provided to store the said fuel and an oxidizing agent such as liquid oxygen or fuming nitric acid. The two components, i.e., the fuel and the oxidizing agent are pumped or supplied by gas pressure to a combustion nozzle wherein complete combustion of the isopropylbicyclohexyl is carried out to develop the desired thrust.

The fuels of the instant invention are eminently suitable for use in jet engines, particularly turbojet and turboprop aircraft engines.

In the operation of turbojet engines, air is withdrawn from the atmosphere into an air compressor, compressed and delivered to the combustion chamber of the engine where it is mixed with these fuels and the mixture ignited. The resulting burning mixture of the fuel and air is diluted with secondary air and expanded through a turbine which drives the air compressor. In these engines, the hot mixture is expanded in the turbine in such a manner that only sufficient energy is extracted from the gases to operate the compressor. The remaining energy is employed to eject the gases in jet form through a jet pipe into the atmosphere and thereby produce thrust.

In using these fuels in turboprop engines, the operation is essentially the same except that the gases are almost completely expanded in the turbine, i.e., they are expanded almost down to the pressure of the surrounding atmosphere, leaving only a relatively small amount of energy to produce thrust when ejected through the jet pipe. Thus, in turboprop engines, the majority of the energy from the hot expanding gases is used to operate the compressor and the propeller and hence the thrust is obtained primarily from the latter.

In many turbojets and turboprop engines, only a single stage turbine is employed. However, more than a single stage may be employed and, if so, guide vanes are introduced between each pair of turbine wheels. After leaving the last turbine wheel, the gas enters the jet pipe and is discharged therefrom into the atmosphere.

In the operation of these engines using the fuels of the instant invention, the fuel and air are charged into the combustion chamber in an initial weight ratio of fuel to air which is substantially in the range of about 0.06 to about 0.11, the particular ratio selected being dependent upon the power requirements at the moment. This mixture is supplemented by secondary air in an amount providing an overall fuel to air weight ratio which does not substantially exceed 0.02 at the entrance to the turbine wheel. Fuel/air weight ratios substantially higher than 0.02 are not desirable since they result in the production of temperatures which cannot be tolerated by turbines with present materials of construction.

The use of any of the products described in the example provides a new method of operating jet engines having all of the advantages over prior jet fuels which are set forth earlier herein.

The fuels of the instant invention may be used advantageously in the spark ignition piston-type aircraft engine, diesel engines, and turbine engines generally, but are particularly suitable for use in ramjet, turbojet and turboprop aircraft engines. However, when the piston-type and diesel engines are employed, the fuel/air ratios are adjusted so as to achieve substantially complete combustion of the air and fuel which means that these ratios fall within the limits of about 0.045 to about 0.110 and preferably within the limits of about 0.045 to about 0.110 and preferably within the limits of about 0.066 to about 0.08.

The fuels of the instant invention may be blended with other materials such as gasoline, kerosene, mixtures of gasoline and kerosene, other aviation fuels, and with present hydrocarbon jet fuels to produce an improved fuel over the presently available fuel. More particularly, the fuels described herein may be added to the present aliphatic hydrocarbon jet fuels having a heat of combustion of about 112,000 B.t.u. per gallon to raise the overall heat of combustion thereof to at least about 120,000 B.t.u. or 125,000 B.t.u. per gallon. Moreover, the fuels described herein may be used in combination with fuel additives to obtain improved results as regards burning characteristics, etc.

The heat of combustion as given in this specification represents the heat of reaction between gaseous oxygen and liquid hydrocarbon to produce gaseous carbon dioxide and water.

While this application discloses the preferred embodiments of our invention, it will be readily apparent to those skilled in the art that many changes and variations may be made without departing from the spirit thereof.

What is claimed is:

1. Method for operating a jet engine which comprises oxidizing as a fuel in the said engine a hydrocarbon fuel consisting essentially of a compound selected from the group consisting of 3-isopropylbicyclohexyl and 4-isopropylbicyclohexyl, the proportion of the said isopropylbicyclohexyl being from 10% to 90% by weight of the fuel.

2. Method for operating a combustion engine which comprises oxidizing as a fuel in the said engine a hydrocarbon fuel consisting essentially of the compound 3-ispropylbicyclohexyl, the proportion of the said compound being from 10% to 90% by weight of the fuel.

3. Method for operating a combustion engine which comprises oxidizing as a fuel in the said engine a hydrocarbon fuel consisting essentially of the compound 4-isopropylbicyclohexyl, the proportion of the said compound being from 10% to 90% by weight of the fuel.

4. Method for operating a combustion engine which comprises oxidizing as a fuel in the said engine a hydrocarbon fuel consisting essentially of the compound 3-isopropylbicyclohexyl in admixture with 4-isopropylbicyclohexyl, the proportion of the said compounds being from 10% to 90% by weight of the fuel.

5. Method for operating a combustion engine which comprises oxidizing as a fuel in the said engine a hydrocarbon fuel consisting essentially of a member of the class consisting of the compound 3-isopropylbicyclohexyl and the compound 4-isopropylbicyclohexyl the proportion of the said compound being from 10% to 90% by weight of the fuel.

6. A method of operating a turbo-jet engine which comprises feeding a mixture of air and a compound selected from the group consisting of 3-isopropylbicyclohexyl and 4-isopropylbicyclohexyl into the combustion chamber of said engine, subjecting said mixture to combustion, passing the resulting hot gases through a turbine to expand the same and then passing the hot gases into the atmosphere by way of a nozzle whereby thrust is produced the proportion of the said isopropylbicyclohexyl being from 10% to 90% by weight of the fuel.

7. A method of operating a ram-jet engine which comprises feeding a mixture of air and a compound selected from the group consisting of 3-isopropylbicyclohexyl and 4-isopropylbicyclohexyl into the combustion chamber of said engine, subjecting the mixture to combustion and then ejecting the resulting hot gases into the atmosphere by way of nozzle whereby thrust is produced the proportion of the said isopropylbicyclohexyl being from 10% to 90% by weight of the fuel.

8. A method of operating a rocket engine which comprises feeding a mixture of an oxidizing agent and a compound selected from the group consisting of 3-isopropylbicyclohexyl and 4-isopropylbicyclohexyl into the combustion chamber of said engine subjecting said mixture to combustion, passing the resulting hot gases out of the said engine by way of a nozzle whereby thrust is produced the proportion of the said isopropylbicyclohexyl being from 10% to 90% by weight of the fuel.

References Cited in the file of this patent

Goodman et al.: "Nat'l Adv. Comm. Aeronaut.," Tech. Note No. 2419, 21 pp., particularly pp. 1 and 7–11 (1951).

Killeffer: "Scientific American," pp. 162–64, September 1945.